(12) United States Patent
Brown et al.

(10) Patent No.: US 8,120,845 B2
(45) Date of Patent: Feb. 21, 2012

(54) COLLIMATED INTENSIFIED VISION SYSTEM AND METHOD OF COLLIMATING

(75) Inventors: Rawlin Heath Brown, Salem, VA (US);
Nils Thomas, Eagle Rock, VA (US);
Kevin Schlirf, Winter Haven, FL (US);
Todd Neff, Salem, VA (US)

(73) Assignee: ITT Manufacturing Enterprises, Inc., Wimington, DE (US)

( * ) Notice: Subject to any disclaimer, the term of this patent is extended or adjusted under 35 U.S.C. 154(b) by 516 days.

(21) Appl. No.: 12/334,738

(22) Filed: Dec. 15, 2008

(65) Prior Publication Data
US 2010/0149633 A1 Jun. 17, 2010

(51) Int. Cl.
*G02B 23/00* (2006.01)
*G02B 27/02* (2006.01)
(52) U.S. Cl. .......................................... 359/399; 359/480
(58) Field of Classification Search .................. 359/399, 359/407, 480, 481
See application file for complete search history.

(56) References Cited

U.S. PATENT DOCUMENTS

| | | | |
|---|---|---|---|
| 2,424,011 A | 7/1947 | DeGramont | |
| 2,861,484 A | 11/1958 | Rance | |
| 3,713,725 A | 1/1973 | Uesugi | |
| 3,737,667 A | 6/1973 | Babb et al. | |
| 4,669,833 A | 6/1987 | Mise | |
| 4,723,075 A | 2/1988 | German | |
| 4,743,763 A | 5/1988 | Cutburth et al. | |
| 5,223,974 A | 6/1993 | Phillips et al. | |
| 5,604,630 A | 2/1997 | Palmer | |
| 6,259,088 B1 | 7/2001 | Antesberger | |
| 6,337,768 B1 | 1/2002 | Carmi et al. | |
| 6,339,500 B1 | 1/2002 | Carmi et al. | |
| 6,411,448 B2 | 6/2002 | Takanashi et al. | |
| 6,456,497 B1 | 9/2002 | Palmer | |
| 6,687,053 B1 | 2/2004 | Holmes et al. | |
| 6,717,754 B2 | 4/2004 | Hirunuma et al. | |
| 7,397,617 B2 | 7/2008 | Floyd et al. | |
| 7,514,664 B2 * | 4/2009 | Moody | 250/214 VT |
| 2001/0022685 A1 | 9/2001 | Carmi et al. | |
| 2005/0128576 A1 | 6/2005 | Perger et al. | |
| 2007/0103796 A1 | 5/2007 | Floyd et al. | |

OTHER PUBLICATIONS

Maier, Eliane, Authorized Officer, International Search Report and Written Opinion of PCT/US2009/063674, European Patent Office, Feb. 11, 2010.
International Search Report for International Application No. PCT/US2006/043373 dated Mar. 29, 2007.

* cited by examiner

*Primary Examiner* — Alessandro Amari
(74) *Attorney, Agent, or Firm* — RatnerPrestia

(57) ABSTRACT

An optical system includes an optical assembly frame having an input portion, an output portion, and an objective lens assembly disposed at the input portion of the optical assembly frame. The objective lens assembly has an objective lens central optical axis. An eyepiece lens assembly is disposed at the output portion of the frame. The eyepiece lens assembly has an eyepiece lens central optical axis parallel to the objective lens central optical axis and offset from the objective lens central optical axis by a distance. An inverting image intensifier is disposed between the objective lens assembly and the eyepiece lens assembly. The image intensifier has an image intensifier optical axis parallel to the objective lens central optical axis and parallel to the eyepiece lens central optical axis. The image intensifier optical axis is offset from both the objective lens central optical axis and the eyepiece lens central optical axis by about half the distance.

17 Claims, 8 Drawing Sheets

COLLIMATED INTENSIFIED VISION SYSTEM AND METHOD OF COLLIMATING

BACKGROUND OF THE INVENTION

In a unity power vision-assisting device, such as a monocular, the device is collimated when the output optical axis matches the input optical axis such that the beam of light entering the device is parallel with the beam of light exiting the device. During manufacturing of the device, a technician typically aligns the optical axes through an iterative process that requires adjustment of the device, securement of the components of the device relative to one another, and determination of whether the device is satisfactorily collimated. If the device is not satisfactorily collimated, the technician must release some of the previously secured components of the device relative to one another and readjust the device. This process may not necessarily collimate the device to the desired degree of collimation. A need exists, therefore, to provide a monocular that includes a mechanism for collimating the output optical axis with the input optical axis to a desired degree of collimation.

SUMMARY OF THE INVENTION

Briefly, the present invention provides an optical system. The optical system comprises an optical assembly frame having an input portion, an output portion, and an objective lens assembly disposed at the input portion of the optical assembly frame. The objective lens assembly has an objective lens central optical axis. An eyepiece lens assembly is disposed at the output portion of the frame. The eyepiece lens assembly has an eyepiece lens central optical axis parallel to the objective lens central optical axis and offset from the objective lens central optical axis by a distance. An image intensifier is disposed between the objective lens assembly and the eyepiece lens assembly. The image intensifier has an image intensifier optical axis parallel to the objective lens central optical axis and parallel to the eyepiece lens central optical axis. The image intensifier optical axis is offset from both the objective lens central optical axis and the eyepiece lens central optical axis by about half the distance.

Additionally, the present invention further provides an optical system comprising an optical frame including an input portion having an objective lens assembly holder and an output portion having an eyepiece lens assembly holder. An objective lens assembly is disposed within the objective lens assembly holder. The objective lens assembly has an objective lens assembly axis. An eyepiece lens assembly is disposed within the eyepiece lens assembly holder. The eyepiece lens assembly has an eyepiece lens assembly axis parallel to the objective lens assembly axis and spaced from the objective lens assembly axis by a distance. An inverting image intensifier is disposed between the objective lens assembly and the eyepiece lens assembly. The inverting image intensifier is coupled to the frame proximate to the objective lens assembly and has an inverting image intensifier axis disposed about half the distance between the objective lens assembly axis and the eyepiece lens assembly axis.

Also, the present invention provides a method of manufacturing a collimated optical device comprising the steps of providing an optical assembly frame having an input portion and an output portion; providing an objective lens assembly having an objective lens central optical axis; fixedly coupling the objective lens assembly to the input portion of the optical assembly frame; providing an eyepiece lens assembly having an eyepiece lens central optical axis parallel to the objective lens central optical axis and offset from the objective lens central optical axis by a distance; fixedly coupling the eyepiece lens assembly to the output portion of the optical assembly frame; inserting an image intensifier between the objective lens assembly and the eyepiece lens assembly, the image intensifier having an image intensifier optical axis parallel to the objective lens central optical axis and the eyepiece lens central optical axis; aligning the image intensifier optical axis to be offset from both the objective lens central optical axis and the eyepiece lens central optical axis by about half the distance; and securing the image intensifier to the optical assembly frame.

BRIEF DESCRIPTION OF THE FIGURES

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Figure 1:
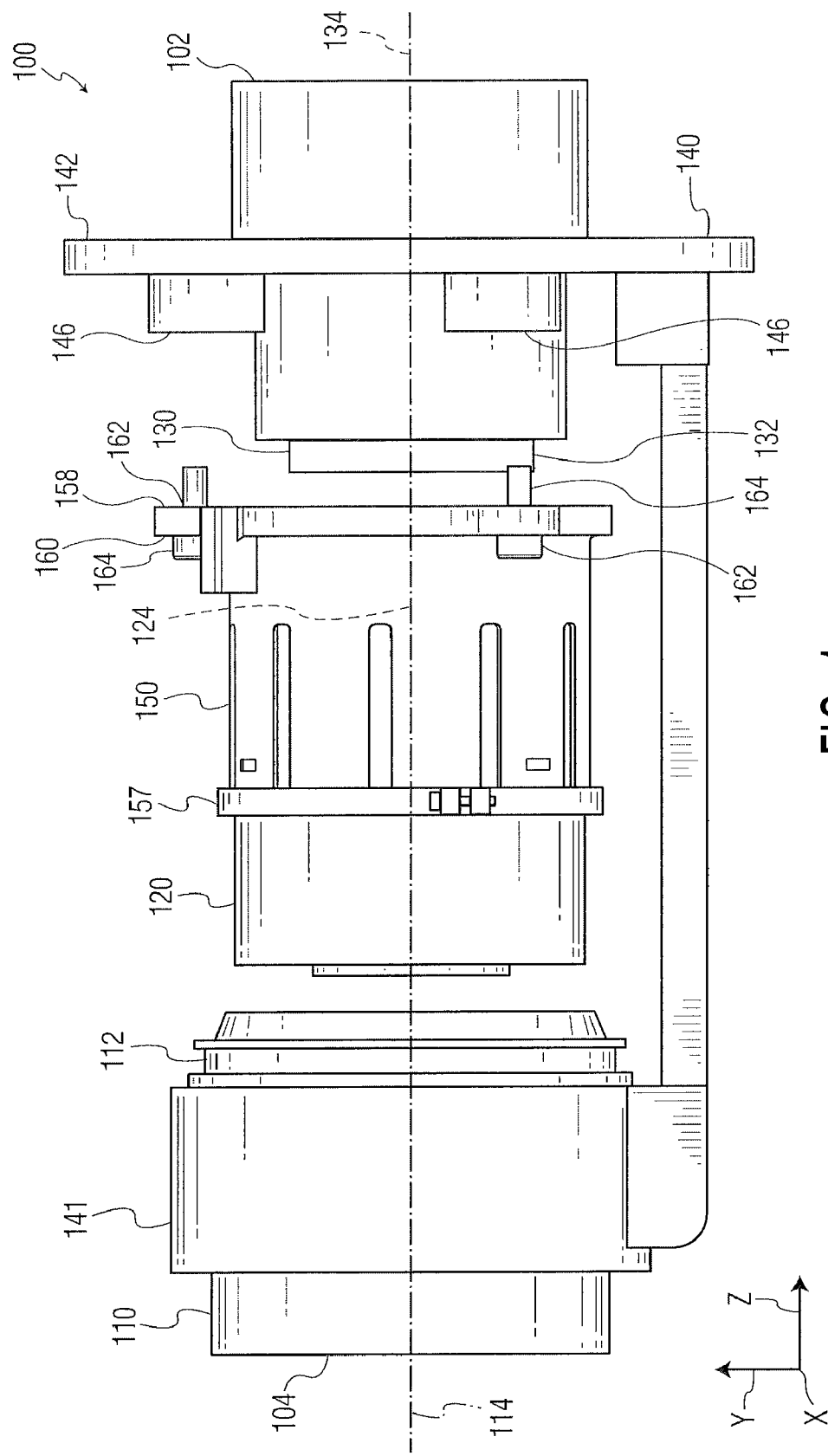
FIG. 1 is a longitudinal side view of a monocular according to an exemplary embodiment of the present invention.

Certain terminology is used herein for convenience only and is not to be taken as a limitation on the present invention. The terminology includes the words specifically mentioned, derivatives thereof and words of similar import. As used herein, the term "input" is defined to mean a direction farther from a user when the monocular is in a use position as described herein and "output" is defined to mean a direction closer to the user when the monocular is in a use position as described herein. The term "optically align" is defined to mean the process of inputting a collimated beam of light to an objective lens assembly of a device that is focused on an infinite target and outputting a resulting collimated beam of light from an eyepiece lens assembly that is set to a zero diopter position such that the inputted and outputted beams are parallel.

The following describes exemplary embodiments of the invention. It should be understood based on this disclosure, however, that the invention is not limited by the exemplary embodiments of the invention.

Referring to the drawings generally, internal components of an optical system, such as a monocular 100, according to an exemplary embodiment of the present invention are shown. The exemplary monocular 100 can be used solely as a monocular or can be part of a night vision goggle (NVG) system (not shown). A night vision goggle is used to intensify ambient or infrared light for enhanced visibility in a darkened environment. Monocular 100 may be part of a helmet-mounted or handheld system. Alternatively, monocular 100 may be used as a sight for a weapon system, such as a rifle or even a tank. Further, monocular 100 may be incorporated into any optical system requiring focusing and collimation.

Referring to FIG. 1, exemplary monocular 100 includes an input portion 102, which receives light from the external environment, and an output portion 104, which transmits an intensified image to a user (not shown). The major components of monocular 100 are, from left to right as shown in FIG. 1, an eyepiece lens assembly 110 at output portion 104, an image intensifier 120, and an objective lens assembly 130 at input portion 102, which are all carried on an optical frame 140.

Eyepiece lens assembly 110 may include a plurality of eyepiece lenses (not shown) disposed therein. The plurality of eyepiece lenses collimate and magnify an image initially captured by objective lens assembly 130. Eyepiece lens assembly 110 further includes an eyepiece lens assembly housing 112 and an eyepiece lens assembly optical axis 114 extending generally parallel to a z-axis Z.

Figure 2:
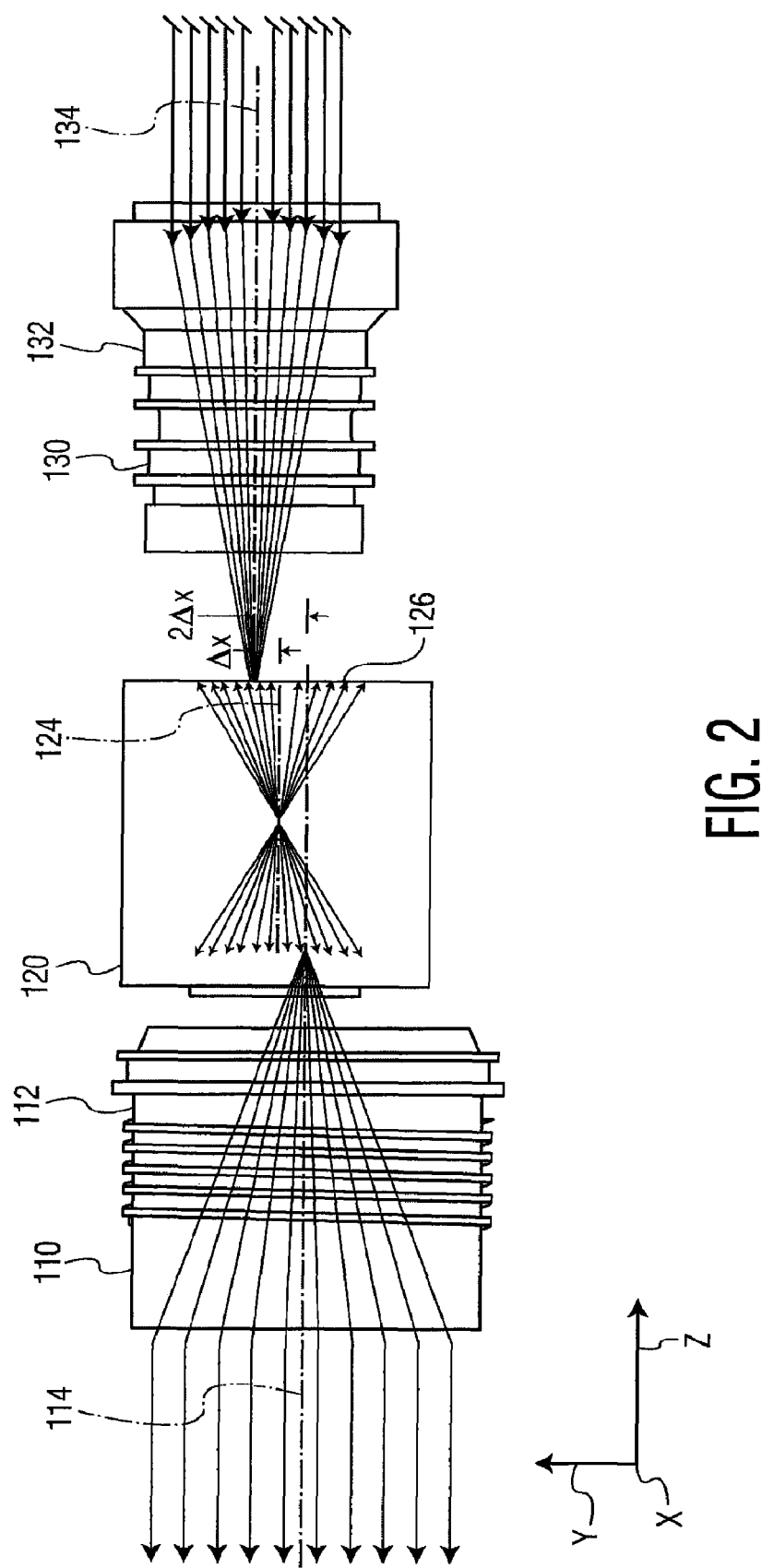
FIG. 2 is a longitudinal side view of the monocular of FIG. 1 showing an exaggerated view of alignment discrepancies among the major components.

Objective lens assembly 130 may include a plurality of objective lenses (not shown) disposed therein. The objective lenses collimate and magnify an image for transmission through image intensifier 120 to eyepiece lens assembly 110 for viewing by a user (not shown). Objective lens assembly 130 further includes an objective lens assembly housing 132 and an eyepiece lens assembly optical axis 134 extending generally parallel to z-axis Z. Eyepiece lens assembly optical axis 114 may be offset from objective lens assembly optical axis 134 by a slight distance, such as, for example, approximately 0.5 millimeters, although those skilled in the art will recognize that the offset distance may be more or less than 0.5 millimeters. This offset may be quantified as a distance "2Δx." FIG. 2 shows an exaggerated relationship of eyepiece lens assembly 110, image intensifier 120, and objective lens assembly 130 in order to illustrate distance 2Δx.

Figure 3:
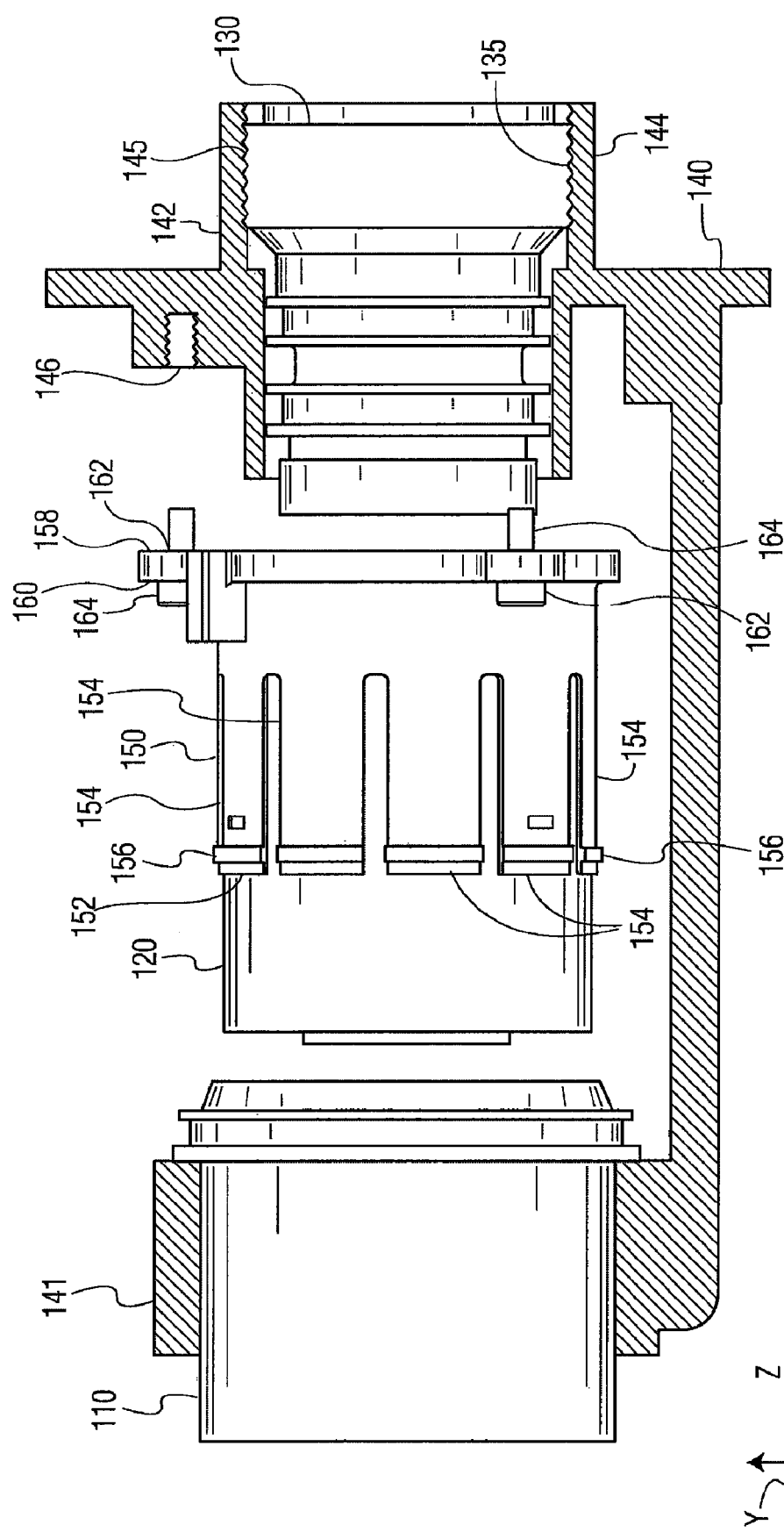
FIG. 3 is a longitudinal side view, partially in section, of the monocular of FIG. 1.

Referring now to the partial sectional view of monocular 100 shown in FIG. 3, optical frame 140 includes an output portion 141 that retains eyepiece lens assembly housing 112 therein. Output portion 141 includes an annular ring that is sized to accept and retain eyepiece lens assembly housing 112 in a fixed position relative to optical frame 140. Although not shown, eyepiece lens assembly housing 112 may be coupled to output portion 141 by any of several known methods, including but not limited to a threaded connection or a bolted connection.

Optical frame 140 also includes an input portion 142 into which objective lens assembly housing 132 is inserted. Input portion 142 includes an annular ring 144 that is sized to accept and retain objective lens assembly housing 132 in a fixed position relative to optical frame 140. Annular ring 144 may include a thread 145 sized to accept a mating thread 135 on objective lens assembly housing 132. The threaded connection between annular ring 144 and objective lens assembly housing 132 not only secures objective lens assembly 130 to optical frame 140, but also allows adjustment of objective lens assembly 130 along z-axis Z, allowing for adjustment of the focus position of objective lens assembly 130 relative to image intensifier 120.

Input portion 142 also includes a plurality of threaded openings 146 spaced generally equidistant around the circumference of annular ring 144. For clarity, only one opening 146 is illustrated in FIG. 3. In an exemplary embodiment, input portion 142 includes three (3) threaded openings 146. Threaded openings 146 are used to secure image intensifier 120 to optical frame 140.

Figure 4:
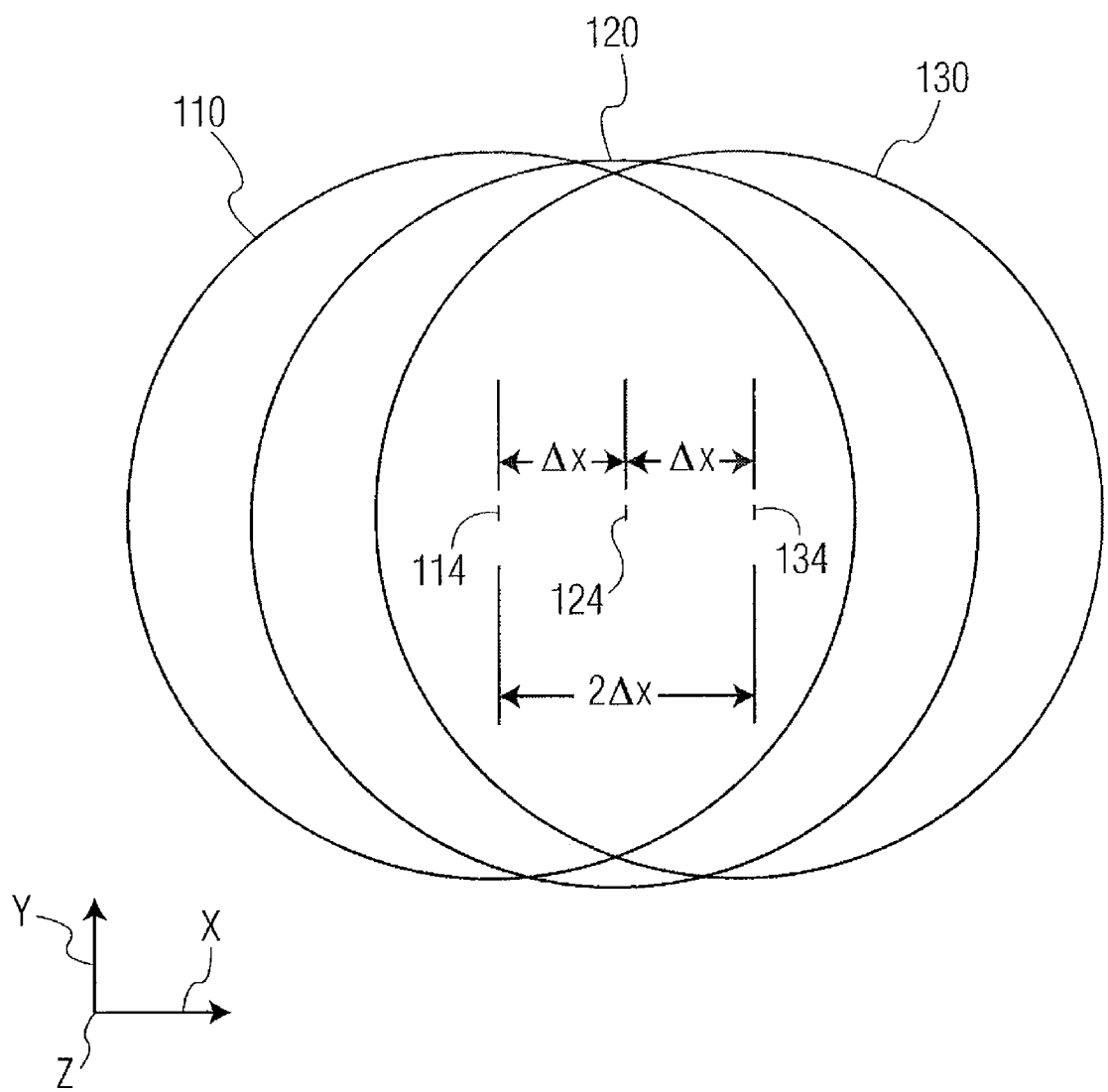
FIG. 4 is a schematic view of distances between axes of the major components shown in FIG. 2.

Referring back to FIG. 2, image intensifier 120 includes an image intensifier housing 122 and an image intensifier optical axis 124 extending generally parallel to z-axis Z. Image intensifier 120 is aligned along both an x-axis X and a y-axis Y such that the distance between image intensifier optical axis 124 and objective lens assembly optical axis 134 is "Δx" and the distance between image intensifier optical axis 124 and eyepiece lens assembly optical axis 114 is also "Δx." A schematic view of the location of image intensifier housing 122 and image intensifier optical axis 124 relative to eyepiece lens assembly housing 112, eyepiece lens assembly optical axis 114, objective lens assembly housing 132, and objective lens assembly optical axis 134 is shown in FIG. 4. Δx may be any direction along a plane defined by x-axis X and y-axis Y, such as the plane of the paper of FIG. 4.

Alignment is achieved when eyepiece lens assembly optical axis 114 and objective lens assembly optical axis 134 are co-planar and when image intensifier optical axis 124 is equidistant from and in the same plane as eyepiece lens assembly optical axis 114 and objective lens assembly optical axis 134.

Image intensifier 120 is an inverting image intensifier having a fiber optic element 126 that has a 180 degree twist. The twist provides image inversion across image intensifier optical axis 124 and allows for alignment by adjustment of the position of image intensifier 120 relative to eyepiece lens assembly 110 and objective lens assembly 130.

Referring back to FIGS. 1 and 3, image intensifier 120 is coupled to frame 140 by a holder, or collet 150, that is generally tubular in shape and is sized to allow image intensifier 120 to be inserted therein. An output portion 152 of collet 150 includes a plurality of fingers 154 that extend longitudinally around the circumference of collet 150. Each finger 154 includes a ridge 156 that extends radially outwardly from collet 150. A locking collar 157 is disposed over ridges 156 and tightened over ridges to secure collet 150 to image intensifier 120.

An input portion 158 of collet 150 includes a flange 160 that extends radially outwardly from collet 150. Flange 160 includes a plurality of bolt holes 162 spaced equidistant around the circumference of flange. In an exemplary embodiment, flange 160 includes three (3) through bolt holes 162. Bolt holes 162 are spaced to correspond with the number and locations of threaded openings 146 on input portion 142 of frame 140.

Figure 5:
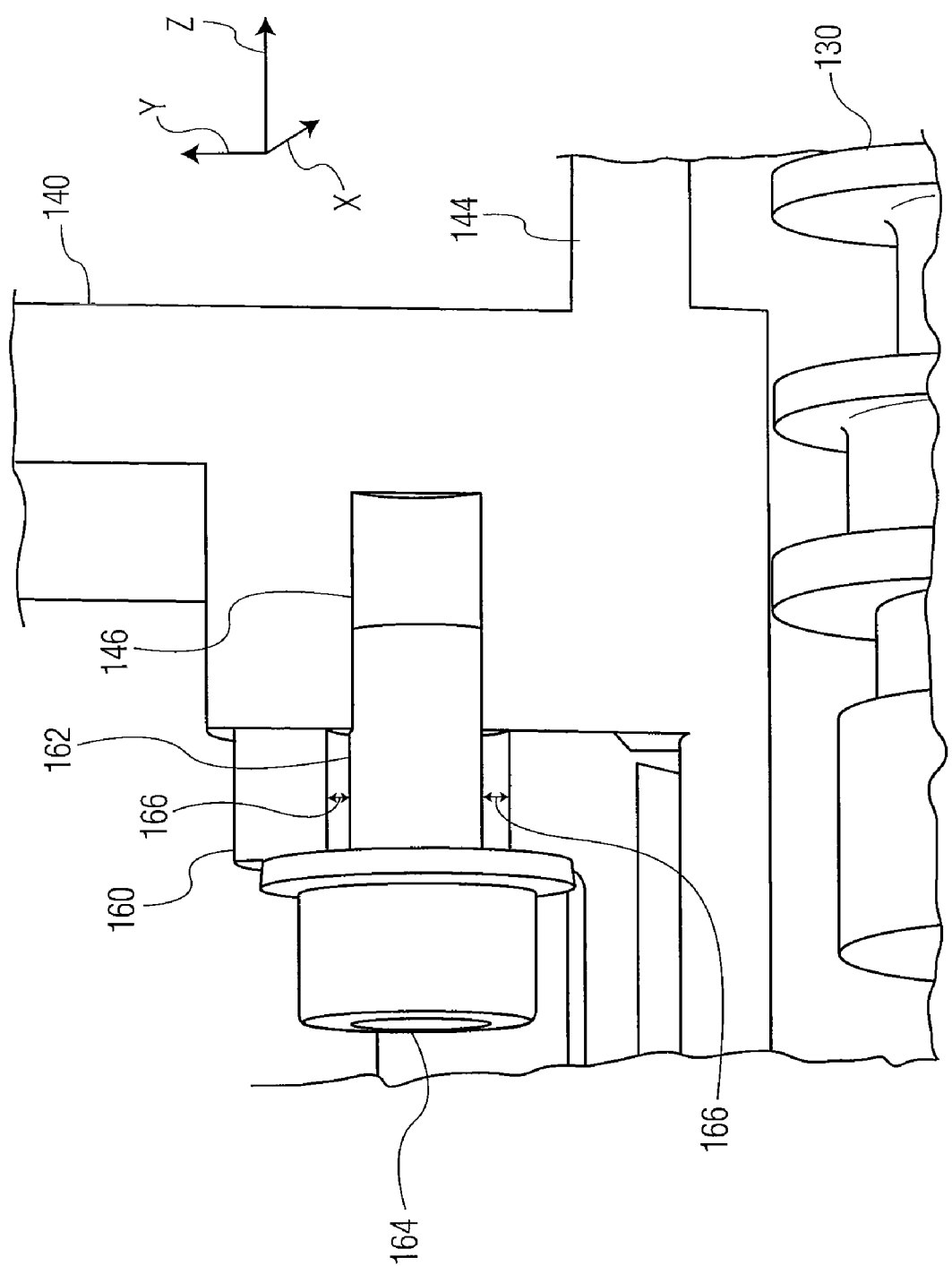
FIG. 5 is an enlarged cutaway perspective view of a portion of a collet flange coupled to a frame of the monocular of FIG. 1.

Referring to the sectional view of FIG. 5, bolt 164 is inserted into each of bolt hole 162 to secure collet 150 to frame 140. Each bolt hole 162 has a diameter sufficiently larger than that of respective bolt 164 such that a gap 166 is present between bolt 164 and the side of bolt hole 162. Gap 166 allows sufficient adjustment of collet 150 and image intensifier 120 along both x-axis X and y-axis Y relative to objective lens assembly 130 to align image intensifier optical axis 124 the desired distance Δx from each of eyepiece lens assembly optical axis 114 and objective lens assembly optical axis 134 in order to optically align monocular 100.

Figure 6:
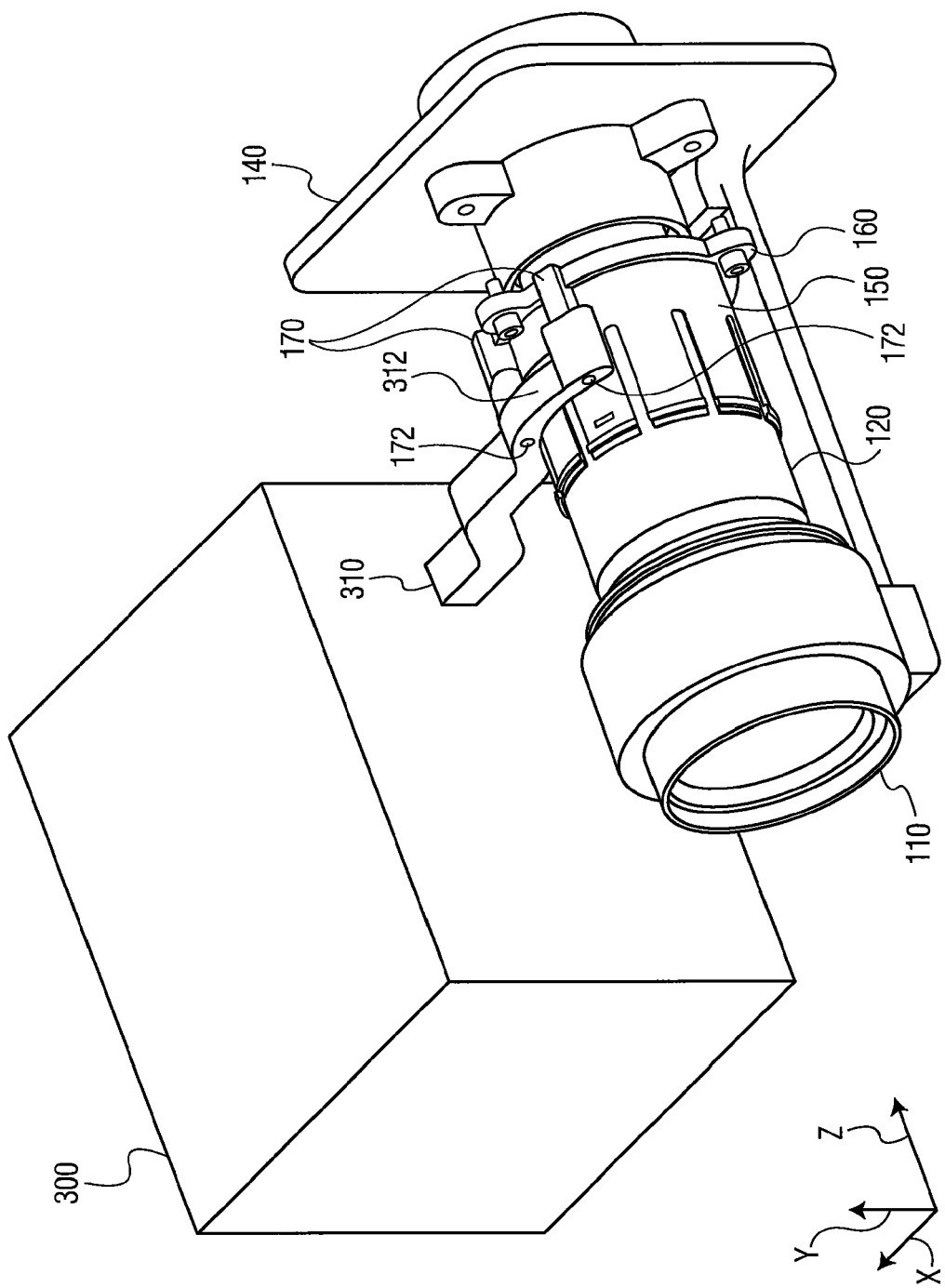
FIG. 6 is a perspective view of an alignment device coupled to the monocular of FIG. 1.

Referring to FIG. 6, flange 160 also includes two (2) alignment bolt holes 170 that are used to couple an alignment tool 300 to collet 150 via bolts 172. Alignment tool 300 may be used to align image intensifier 120 with eyepiece lens assembly 110 and objective lens assembly 130 such that image intensifier optical axis 124 is a distance Δx from each of eyepiece lens assembly optical axis 114 and objective lens assembly optical axis 134.

Alignment tool 300 includes an adjustment arm 310 that is infinitely movable along each of x-axis X, y-axis Y, and z-axis Z. Adjustment arm 310 includes an arcuate free portion 312 that releasably engages collet 150 such that image intensifier 120 moves with arm 310 along x-axis X, y-axis Y, and z-axis Z as arm 310 is adjusted.

Figure 8:
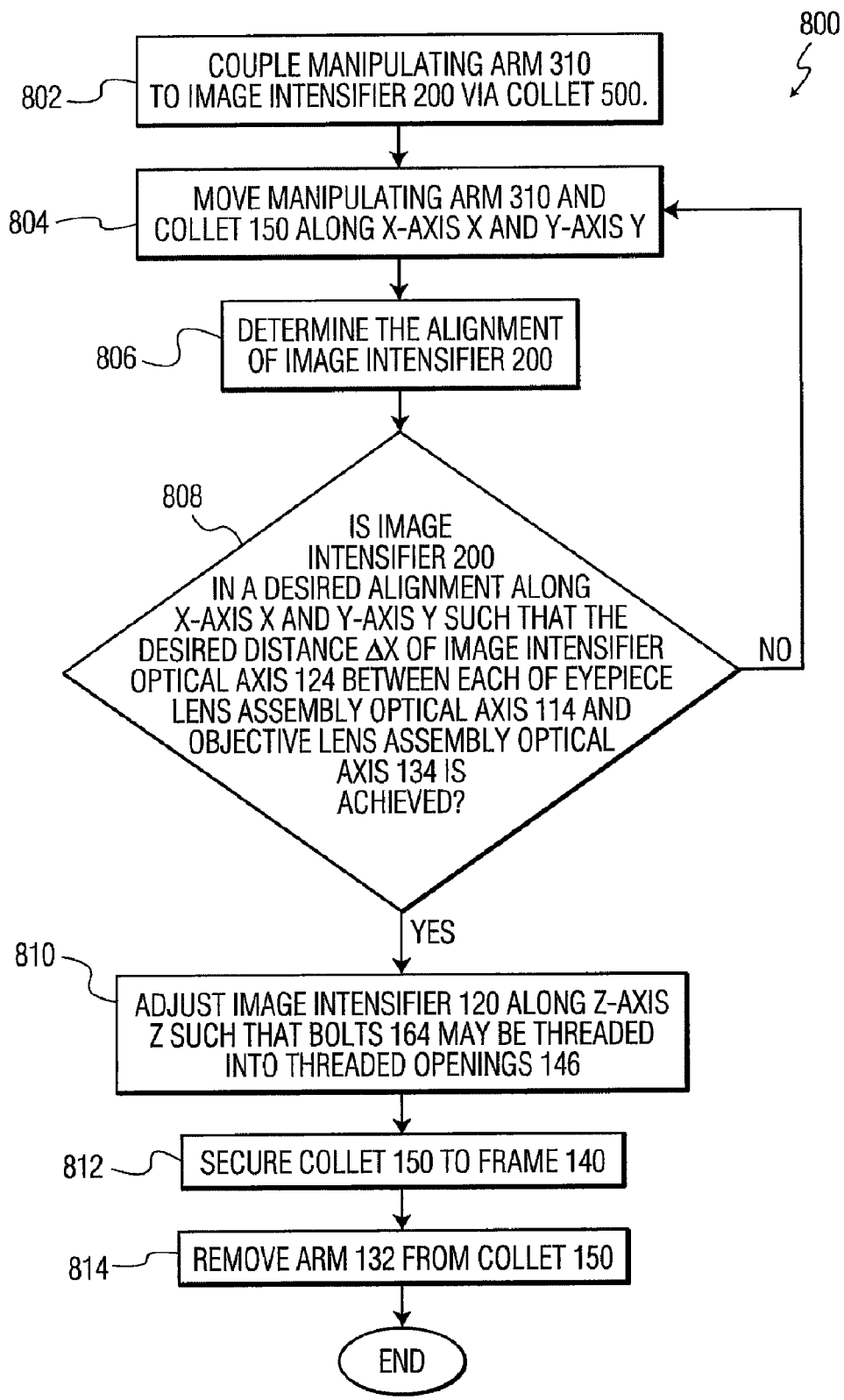
FIG. 8 is a flow chart illustrating steps perfomed to optically align the monocular of FIG. 1.

Referring to the flow chart 800 in FIG. 8, in STEP 802, alignment of image intensifier axis 124 relative to eyepiece lens assembly optical axis 114 and objective lens assembly optical axis 134 may be performed by coupling manipulating arm 310 to image intensifier 200 via collet 500. In STEP 804, manipulating arm 310 and collet 150 are moved along x-axis X, y-axis Y, and in STEP 806, the alignment of image intensifier 200 is determined using known tools for optical alignment (not shown). In STEP 808, if image intensifier 200 is not in a desired alignment along x-axis X and y-axis Y such that the desired distance Δx of image intensifier optical axis 124 between each of eyepiece lens assembly optical axis 114 and objective lens assembly optical axis 134 is achieved, STEPs 804 and 806 are repeated until such alignment is achieved.

In STEP 808, once image intensifier 200 is in a desired alignment along x-axis X and y-axis Y such that the desired distance Δx of image intensifier optical axis 124 between each of eyepiece lens assembly optical axis 114 and objective lens assembly optical axis 134 is achieved, in STEP 810, image intensifier 120 may be adjusted along z-axis Z such that bolts 164 may be threaded into threaded openings 146 to secure collet 150 to frame 140 in STEP 812, and as shown in FIG. 5. In STEP 814, after collet 150 is secured to frame 140, arm 132 may be removed from collet 150.

Figure 7:
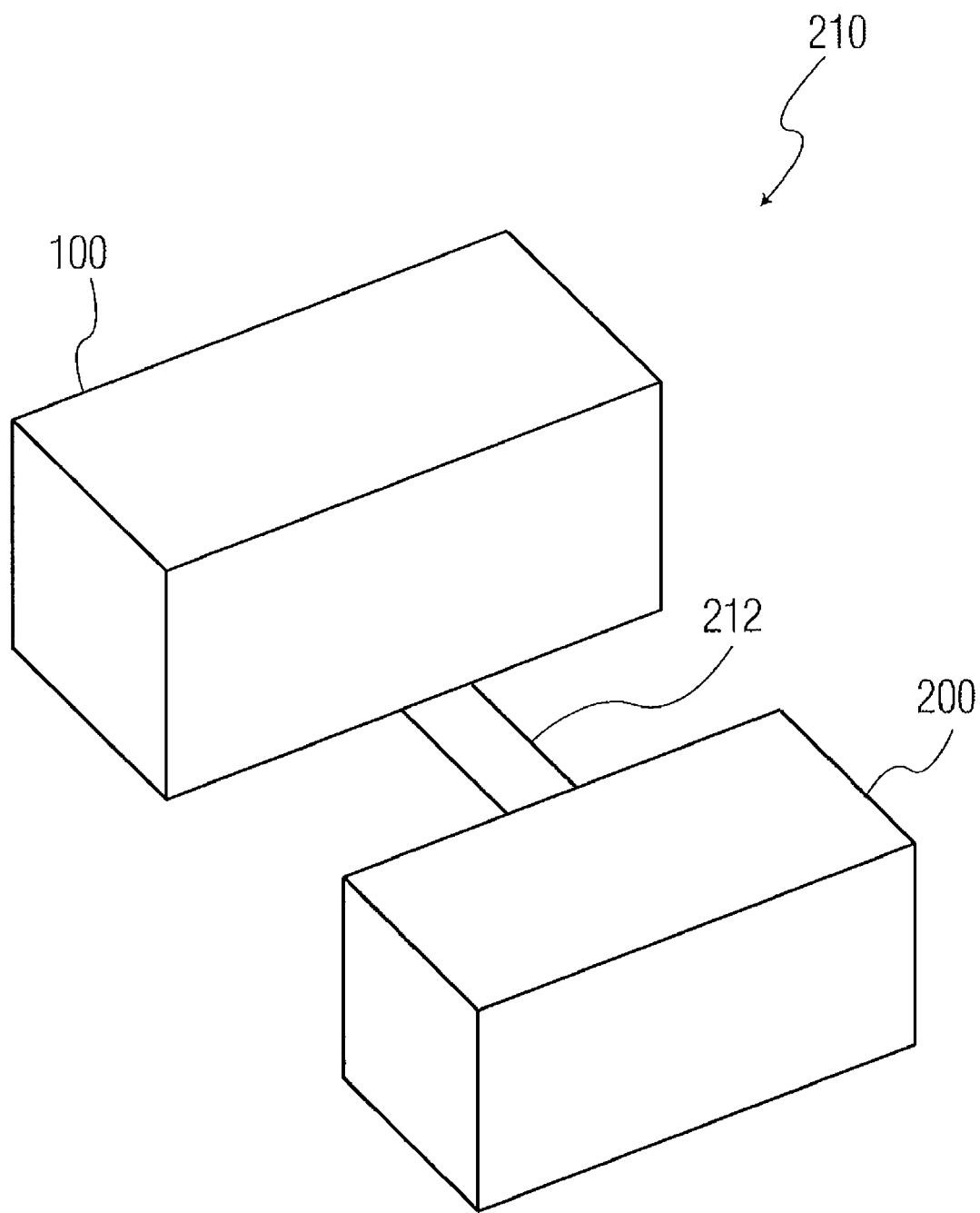
FIG. 7 is a schematic view of an exemplary embodiment of a binocular incorporating two monoculars as shown in FIG. 1.

Referring to FIG. 7, a second monocular 200, identical to monocular 100, may be used in conjunction with monocular 100 to form binocular 210. Second monocular 200 may be structurally similar to monocular 100. First and second monoculars 100, 200 are releasably connected to a binocular frame 212. In the event that one of monoculars 100, 200 needs to be repaired or replaced, that monocular is removed from binocular frame 212 and repaired or replaced.

Although the invention is illustrated and described herein with reference to a specific embodiment, the invention is not intended to be limited to the details shown. Rather, various modifications may be made in the details within the scope and range of equivalents of the claims and without departing from the invention. While exemplary embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An optical system comprising:
    an optical assembly frame having an input portion and an output portion;
    an objective lens assembly disposed at the input portion of the optical assembly frame, the objective lens assembly having an objective lens central optical axis;
    an eyepiece lens assembly disposed at the output portion of the optical assembly frame, the eyepiece lens assembly having an eyepiece lens central optical axis parallel to the objective lens central optical axis and offset from the objective lens central optical axis by a distance;
    an image intensifier disposed between the objective lens assembly and the eyepiece lens assembly, the image intensifier having an image intensifier optical axis parallel to the objective lens central optical axis and parallel to the eyepiece lens central optical axis, the image intensifier optical axis being offset from both the objective lens central optical axis and the eyepiece lens central optical axis by about half the distance; and
    an image intensifier collet disposed around a circumference of the image intensifier and coupled to the optical assembly frame.

2. The optical system according to claim 1, wherein the image intensifier comprises an inverting image intensifier.

3. The optical system according to claim 2, wherein the inverting image intensifier optically aligns the objective lens assembly with the eyepiece lens assembly.

4. The optical system according to claim 1, further comprising a space between the image intensifier and the eyepiece lens assembly.

5. The optical system according to claim 1, wherein the image intensifier collet secures the image intensifier to the optical assembly frame.

6. The optical system according to claim 1, wherein the image intensifier collet is adjustably coupled to the input portion of the frame.

7. A binocular comprising:
    a binocular frame;
    a first monocular according to claim 1 coupled to the binocular frame; and
    a second monocular according to claim 1 coupled to the binocular frame.

8. The binocular according to claim 7, wherein the first and second monoculars are each separately releasably connected to the binocular frame.

9. An optical system comprising:
    an optical frame including:
        an input portion having an objective lens assembly holder; and
        an output portion having an eyepiece lens assembly holder;
    an objective lens assembly disposed within the objective lens assembly holder, the objective lens assembly having an objective lens assembly axis;
    an eyepiece lens assembly disposed within the eyepiece lens assembly holder, the eyepiece lens assembly having an eyepiece lens assembly axis parallel to the objective lens assembly axis and spaced from the objective lens assembly axis by a distance;
    an inverting image intensifier disposed between the objective lens assembly and the eyepiece lens assembly, the inverting image intensifier being coupled to the frame proximate to the objective lens assembly and having an inverting image intensifier axis disposed about half the distance between the objective lens assembly axis and the eyepiece lens assembly axis; and
    a collet secured to the image intensifier and to the optical frame.

10. The optical system according to claim 9, wherein the inverting image intensifier is coupled to the input portion of the optical frame.

11. The optical system according to claim 9, wherein the objective lens assembly is adjustably coupled to the objective lens assembly holder.

12. A binocular comprising:
    a binocular frame;
    a first monocular according to claim 9 coupled to the binocular frame; and a second monocular according to claim 8 coupled to the binocular frame.

13. The binocular according to claim 12, wherein the first and second monoculars are each separately releasably connected to the binocular frame.

14. An optical system comprising:
an optical assembly frame having an input portion and an output portion;
an objective lens assembly disposed at the input portion of the optical assembly frame, the objective lens assembly having an objective lens central optical axis;
an eyepiece lens assembly disposed at the output portion of the optical assembly frame, the eyepiece lens assembly having an eyepiece lens central optical axis parallel to the objective lens central optical axis and offset from the objective lens central optical axis by a distance of $2\Delta X$; and
an inverting image intensifier disposed between the objective lens assembly and the eyepiece lens assembly, the image intensifier having an image intensifier optical axis parallel to the objective lens central optical axis and parallel to the eyepiece lens central optical axis,
wherein, in a desired alignment, the image intensifier optical axis is offset from both the objective lens central optical axis and the eyepiece lens central optical axis by a distance of $\Delta X$, which is half of $2\Delta X$.

15. The optical system according to claim 14, further comprising an image intensifier collet disposed around a circumference of the image intensifier and coupled to the optical assembly frame,
wherein the image intensifier collet secures the image intensifier to the optical assembly frame.

16. An optical system comprising:
an optical frame including:
an input portion having an objective lens assembly holder; and
an output portion having an eyepiece lens assembly holder;
an objective lens assembly disposed within the objective lens assembly holder, the objective lens assembly having an objective lens assembly axis;
an eyepiece lens assembly disposed within the eyepiece lens assembly holder, the eyepiece lens assembly having an eyepiece lens assembly axis parallel to the objective lens assembly axis and spaced from the objective lens assembly axis by a distance $2\Delta X$; and
an inverting image intensifier disposed between the objective lens assembly and the eyepiece lens assembly,
wherein the inverting image intensifier is coupled to the frame proximate to the objective lens assembly and, in a desired alignment, has an inverting image intensifier axis disposed half the distance between the objective lens assembly axis and the eyepiece lens assembly axis by a distance of $\Delta X$.

17. The optical system according to claim 16, further comprising a collet secured to the image intensifier and to the optical frame,
wherein the objective lens assembly is adjustably coupled to the objective lens assembly holder.

\* \* \* \* \*